US008474008B2

(12) United States Patent
Leconte et al.

(10) Patent No.: US 8,474,008 B2
(45) Date of Patent: Jun. 25, 2013

(54) METHODS AND DEVICES FOR MANAGING EVENTS LINKED TO THE SECURITY OF THE COMPUTER SYSTEMS OF AIRCRAFT

(75) Inventors: Bertrand Leconte, Toulouse (FR); Raphael Migliasso, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 473 days.

(21) Appl. No.: 12/731,364

(22) Filed: Mar. 25, 2010

(65) Prior Publication Data

US 2010/0257581 A1 Oct. 7, 2010

(30) Foreign Application Priority Data

Apr. 6, 2009 (FR) ...................................... 09 52235

(51) Int. Cl.
*G06F 17/00* (2006.01)
*G01D 3/00* (2006.01)
(52) U.S. Cl.
USPC .............................................. 726/1; 702/108
(58) Field of Classification Search
USPC .................................... 726/1, 22, 26; 702/108
See application file for complete search history.

(56) References Cited

U.S. PATENT DOCUMENTS 6,446,136 B1 * 9/2002 Pohlmann et al. ............. 719/318
7,143,438 B1 * 11/2006 Coss et al. ...................... 726/11
2002/0083168 A1 * 6/2002 Sweeney et al. ............... 709/224
2003/0027550 A1   2/2003 Rockwell
2005/0060562 A1 * 3/2005 Bhattacharya et al. ........ 713/200
2005/0099288 A1 * 5/2005 Spitz et al. ..................... 340/506
2007/0118906 A1   5/2007 Mustafa et al.
2007/0169194 A1   7/2007 Church et al.
2008/0086554 A1   4/2008 Royalty
2010/0284249 A1 * 11/2010 Steadman ...................... 367/118

FOREIGN PATENT DOCUMENTS

EP        1 944 676 A1      7/2008
WO     WO 2008/033684 A2   3/2008
WO     WO 2008/033684 A3   3/2008

OTHER PUBLICATIONS

Chris A. Wargo, et al., "Security Considerations for the e-Enabled Aircraft," Aerospace Conference, 2003. Proceedings. 2003 IEEE, Mar. 2003, vol. 4, XP010660380, pp. 1533-1550

* cited by examiner

*Primary Examiner* — Aravind Moorthy
*Assistant Examiner* — Shu Chun Gao
(74) *Attorney, Agent, or Firm* — Oblon, Spivak, McClelland, Maier & Neustadt, L.L.P.

(57) ABSTRACT

The invention in particular has as an object methods and devices for management of events linked to the security of aircraft computer systems. After having received at least one information item relating to the detection (110) of at least one event, the latter is characterized (125) according to at least one rule of a plurality of predetermined rules, that can be updated, to allow the establishment of a security report according to the said characterization of the said at least one detected event. The said at least one event advantageously is detected according to a set of predetermined events, the said set of predetermined events being updated according to a previously detected event.

10 Claims, 4 Drawing Sheets

METHODS AND DEVICES FOR MANAGING EVENTS LINKED TO THE SECURITY OF THE COMPUTER SYSTEMS OF AIRCRAFT

This invention relates to the security of aircraft and more particularly of methods and devices for management of events linked to the security of aircraft computer systems.

In general, most aircraft nowadays integrate procedures and mechanisms for management of their maintenance. More precisely, the mechanisms for detection of events that may play a role in the maintenance operations, the procedures and mechanisms making it possible to correlate these events in order to identify or anticipate possible breakdowns as well as the procedures making it possible to make repairs or to perform preventive maintenance operations are defined during the design phase of the aircraft.

Nevertheless, until a very recent past, the design of the aircraft did not integrate the definition of mechanisms for detection of events that may have a role with regard to the security of the computer systems and, consequently, did not integrate the definition of the procedures and mechanisms making it possible to process them.

Although this aspect is to be taken into consideration from now on, it poses numerous problems linked to the nature of the computer systems.

In particular, this new design constraint brings out three types of difficulties:
the difficulty of specifying the events to be detected;
the difficulty of defining the correlation rules to be applied to the detected events; and
the difficulty of defining a coherent process for processing of the results deriving from application of these correlation rules so as to maintain an aircraft in an operational state.

These difficulties essentially are linked to the fact that the security events that are to be processed are continuously evolving, independently of their functional definition, because the nature of the potential attempts on the security of the computer systems of the aircraft is continuously evolving.

The difficulties linked to the specification of the events to be detected and to the definition of the correlation rules to be applied to the detected events cannot be defined for the entire lifetime of an aircraft. In fact, they are directly linked to the types of computer attacks that may be carried out. These specifications and these definitions therefore cannot be given in the absolute.

Furthermore, as for the difficulty of defining a coherent process for processing the results deriving from the application of these correlation rules so as to maintain an aircraft in an operational state, it is linked to the completeness of the definition of the process for processing outputs of the correlation rules. In fact, this process must be capable, at all times, of processing the fact that the detected events and the defined correlation rules are not complete while ensuring an acceptable period for restoration to operational condition.

The invention makes it possible to resolve at least one of the problems set forth above.

The invention thus has as an object a computer method for management of at least one event linked to the security of at least one computer system of an aircraft, this method comprising the following steps,
receiving at least one information item relating to the detection of the said at least one event;
characterizing the said at least one detected event according to at least one rule of a plurality of predetermined rules; and,
establishing a security report according to the said characterization of the said at least one detected event.

The method according to the invention thus contributes to the evaluation of the level of threat for an aircraft by allowing the establishment of a report on the security of the computer systems of the aircraft according to detected events and predetermined rules. The method according to the invention further makes it possible, in particular, to improve the response of the members of the crew and/or of the maintenance teams in the face of risks to which the computer systems are exposed by identifying dubious events, that is to say events characterizing specific risks, as early as possible.

The method advantageously further comprises a step of updating the said plurality of rules according to a previously detected event.

The method according to the invention thus is evolutional and makes it possible in particular to limit the detection of events not constituting real risks for the aircraft, to improve the knowledge base used by consolidating the rules base and to refine the automatic in-flight analysis through an analysis on the ground.

According to a specific embodiment, the method further comprises a step of detecting the said at least one event, the said at least one event being detected according to a set of predetermined events, the said set of predetermined events being updated according to a previously detected event. In this way the method according to the invention is adapted for evolving to detect new risks in accordance with detected events.

The method preferably further comprises a step of analyzing the said report in order to determine whether or not the detected events are associated with a rated functioning of the system.

According to a specific embodiment, the method further comprises a step of determining at least one new rule in response to the said analysis of the said report, the said plurality of predetermined rules being updated according to the said at least one new rule determined. In this way the method according to the invention is adapted for evolving in order to detect new risks and/or to prevent erroneous detection of risks.

The method advantageously further comprises a step of verifying and validating at least one information item of the said report in order to improve the efficacy of the method and the relevance of the security report.

Still according to a specific embodiment, the method further comprises a step of inserting into the said report at least one indication relating to the context associated with the said at least one detected event in order to make it possible, if need be, to refine the detection of risks according to the context.

The method preferably further comprises a step of updating the definition of the aircraft so that same is in conformity with the aircraft after a modification of a component thereof having as an object the implementation of a security solution making it possible to eliminate detected threats.

The invention also has as an object a device comprising means adapted for the implementation of each of the steps of the method described above, as well as a computer program comprising instructions adapted for the implementation of each of the steps of the method described above when the said program is run on a computer.

Other advantages, purposes and characteristics of this invention become apparent from the detailed description that follows, provided by way of non-limitative example, with reference to the attached drawings in which:

FIG. 1 schematically shows an exemplary algorithm for detection and correlation of events deriving from computer systems of an aircraft;

FIG. 2 illustrates an exemplary algorithm for maintenance of the computer systems of an aircraft in operational condition following the detection of events deriving from these computer systems as well as for improvement of the design of the aircraft;

FIG. 3 schematically shows an exemplary algorithm implemented in a correlation engine illustrated on FIG. 1 for applying the rules to detected events;

According to the invention, the management of events linked to the security of aircraft computer systems comprises, on the one hand, a mechanism for detection and for correlation of detected events and, on the other hand, a mechanism for maintenance of the computer systems of an aircraft in operational condition following the detection of events deriving from these computer systems as well as for improvement of the design of aircraft concerning, in particular, the adaptation of the parameters used by the mechanism for detection and correlation.

Figure 1:
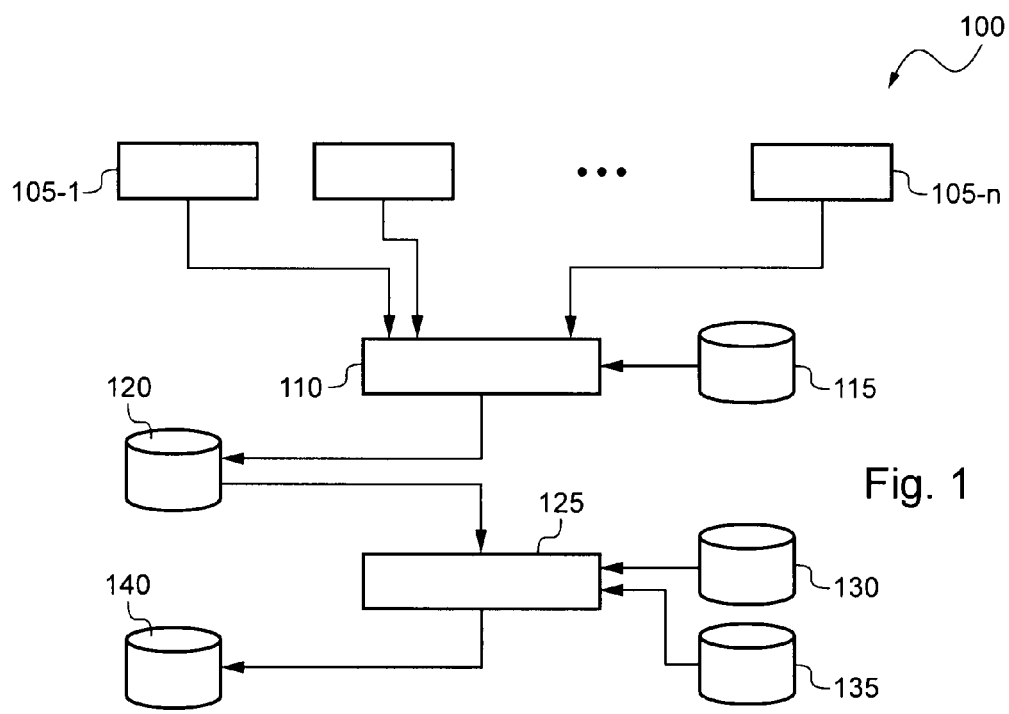

FIG. 1 schematically shows an exemplary algorithm 100 for detection and correlation of events deriving from computer systems of an aircraft.

According to a first embodiment, the identification of events may be accomplished at each of the computer systems 105-1 to 105-n. An information item representative of these identified events then is transmitted to a module 110 for detection of events which compares the identified events with a list of predetermined events stored, for example, in database 115. The identified events belonging to the list of predetermined events then are stored, for example, in database 120. These events are called the detected events.

Alternatively, according to another embodiment, each of the computer systems 105-1 to 105-n transmits information items relating to its state and its activity to module 110 for detection of events. Module 110 here comprises an analysis engine for identifying events from information items received. The identified events then are compared to a list of predetermined events stored, for example, in database 115. As before, the identified events belonging to the list of predetermined events then are stored, for example, in database 120. Again, these events are called the detected events.

An event to be detected is, for example, the connection or the disconnection of a user system with a computer system of the aircraft.

The detected events are used by correlation engine 125 applying the rules stored, for example, in database 130. Correlation engine 125 advantageously also is based on the context of the aircraft including, for example, the flight phase. These context data may be obtained directly from the systems involved or via a database 135.

It should be noted that the list of predetermined events, that is to say the list of events to be detected, as well as the rules used by the correlation engine are linked to an aircraft standard defining a coherent set of hardware and software components defined for a given version. By way of illustration, an aircraft standard may be defined by a list of hardware components marked $HW_i$ and software components marked $SW_j$. Each component is referenced by a part number, called PNR (abbreviation for Part NumbeR in English terminology). A version is associated with each component. For example, $HW\_V_i$ designates the version associated with the hardware component $HW_i$ and $SW\_V_j$ designates the version of the software component $SW_j$. A software component $SW_j$ may be associated with a hardware component $HW_i$.

The result of correlation of the detected events here is stored in the form of a report in database 140. This report preferably is made up of two parts: a report comprising processed information items and a residue of unprocessed information items. These two parts may be in the form of two separate files. A level of criticality, determined by the correlation engine, advantageously is associated with each detected event or with each information item resulting from the processing of at least one detected event.

According to a specific embodiment, the data deriving from the correlation engine are distributed between the report and the residue of unprocessed information items according to the following criteria, the detected events for which no rule has made it possible to identify a specific cause are added to the residue of unprocessed information items. These events are to be the subject of a detailed analysis the purpose of which is to associate them with new rules so that the consolidated rules base makes it possible no longer to see such events appear in the residue of unprocessed information items (one purpose being to reduce the file for residue of unprocessed information items to a size close to zero);

the events that correspond to normal events, with no effect on the security of the computer systems of the aircraft, and for which the level or criticality is less than or equal to a predetermined threshold, for example 50, are stored in the report. These events do not require any special action on the part of the maintenance teams. Such an event corresponds, for example, to the loading of a file (load function) in a computer system 105-i. The level of criticality associated with such an event is, by way of illustration, 10;

the events identified by a rule, in particular a rule of contextual type, and the level of criticality of which exceeds the predetermined threshold, for example 50, are added to the report. These events preferably are to be verified and validated. By way of illustration, the use of a system for detection of intrusion implemented out of the provided context may bring about an event the level of criticality of which is 60. These events may necessitate an action on the part of the maintenance team. Two verification phases advantageously are provided:

a first phase, immediately after the flight during which the event was detected, according to which the verification is performed according to the information items contained in the on-board log, called logbook in English terminology, and the information items communicated by the pilot; and a second phase, performed after the maintenance phase following the detection of this event, according to which the verification is performed according to the information items contained in the logbook and the information items provided by the maintenance team;

It is seen here that the verified events are to be the subject of a commentary on the part of the verifier, that is to say, a priori, the maintenance team. The latter is to indicate in the report why the event is normal or specify that a detailed analysis is necessary. In the latter case, the information will go back with the residue of unprocessed information items, with a high priority.

the events identified by the correlation engine with the aid of a non-contextual rule and for which the level of criticality exceeds the predetermined threshold, for example 50, are stored in the report. By way of illustration, such an event may be the request for opening of session, from a specific system, which was formulated 35,000 times during the last two hours. The level of criticality for such an event is, for example, 70. A detailed analysis is necessary here in order to explain the problem.

Figure 2:
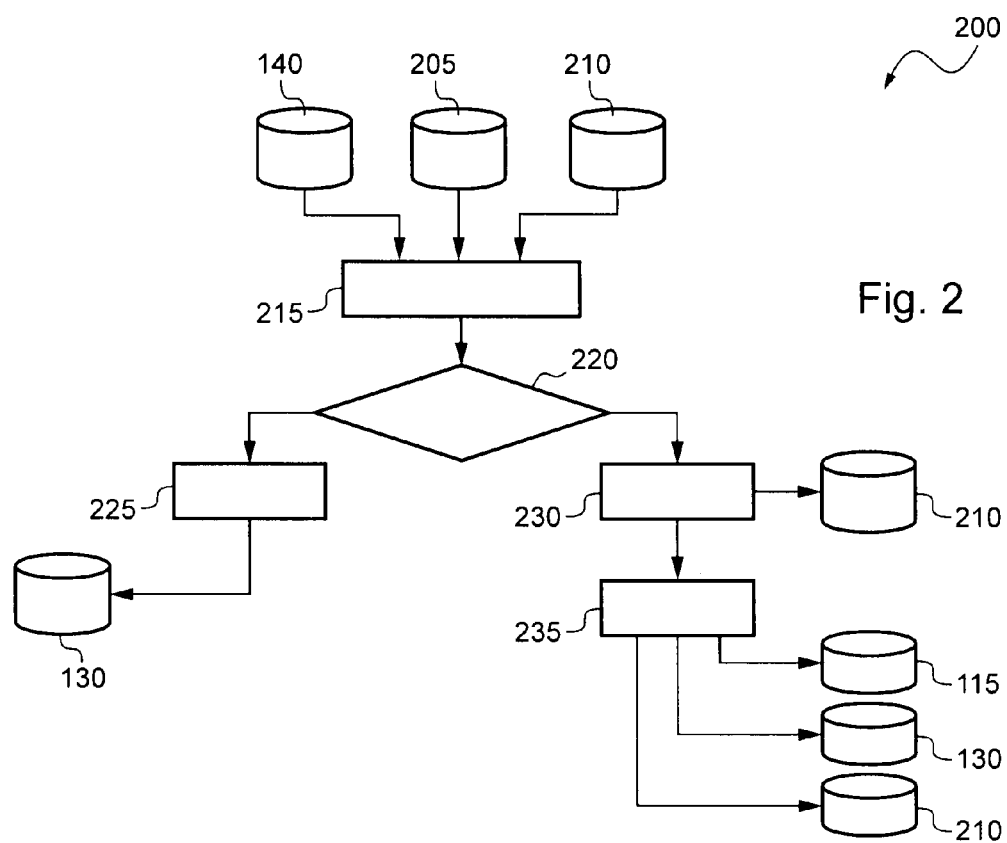

FIG. 2 illustrates an exemplary algorithm 200 for maintenance of the computer systems of an aircraft in operational condition following the detection of events deriving from these computer systems as well as for improvement of the design of the aircraft concerning, in particular, the adaptation of the parameters used by the mechanisms for detection and correlation.

Algorithm 200 has as an object to process the information items deriving from correlation engine 125, that is to say the information items contained in the report and in the residue of unprocessed information items, here stored in database 140.

These information items are consolidated compared to the information items of the logbook, being able to be stored, for example, in database 205, and the documentation data of the aircraft, here stored in database 210. This consolidation may be performed automatically in module 215 or be performed by an operator.

The consolidated information items then are analyzed in order to determine whether or not the detected events are associated with a rated functioning of the system. Again, this analysis may be performed automatically in module 220 or be performed by an operator.

If the detected events are associated with a rated functioning of the system, this information is added to the definition of the standard for the aircraft by module 225. In other words, one or more new rules are created and added to database 130 so that when a similar event is detected, it will be considered as normal by correlation engine 125.

If, on the contrary, the detected events are not associated with a rated functioning of the system, that is to say if the detected events are associated with a failure or with a new attack on the computer systems, actions are taken, preferably in two phases:

in a first step, a definition of a solution that can be transmitted rapidly to the aircraft, making it possible to circumvent the new attack, is determined in module 230. This definition consists, for example, in modifying the documentation of the aircraft, here stored in database 210, so as to indicate a counteraction to the pilot and/or to the maintenance teams; and, in a second step, a definitive solution is identified in module 235 in order to circumvent the attack. This solution consists, for example, in modifying the list of events to be detected, here stored in database 115, the rules used by the correlation engine 125, here stored in database 130, and/or the documentation of the aircraft, here stored in database 210. The definition of the aircraft, that is to say the aircraft standard, also may be modified following, for example, the implementation of security solutions making it possible to eliminate detected threats.

The analysis performed in module 220 and the solution definition in modules 225, 230 and 235 are design activities. They do not form part of the definition of the aircraft standard. It should be noted here that the analysis performed in module 220 may comprise added actions of coordination with the airline companies in order to confirm or invalidate operations making it possible to refine the analysis.

Each line of the report generated by the correlation engine preferably relates to an information item resulting from the processing of one or more processed events. A level of criticality the value of which is, for example, between 1 and 100, is associated with each line generated in the report. Level 1 here corresponds to information items with no danger, while level 100 indicates a maximum alert level. In general, levels exceeding 50 indicate a potential danger. Beyond 80, the events correspond to events, in particular events close together in time, for which the aircraft is not protected.

The level of criticality is determined by the rule or rules from which the information items of the report are determined. As indicated above, this level of criticality is used in particular in order to determine the events to be verified and validated. By way of illustration, the events to be verified and validated may be those associated with a level of criticality exceeding 50.

The determination of the level of criticality by the rules here is predetermined. However, a dynamic table of criticality may be managed on the ground taking into account the recurrence of experience. In this way, an event deemed critical may have its level of criticality reduced. The values of such a table may be transmitted to an aircraft during updates of the latter (changes in standard).

Several types of rules advantageously are used to structure, organize and clarify the database for the rules and so as to arrange the processing of the detected events. Each type of rule contributes elements for obtaining a consolidated report and limiting the residue of unprocessed information items. The types of rules used are, for example, the following, rules for definition of context: these are the rules that make it possible to define the contexts used by the contextual rules. These rules make it possible in particular to identify the flight phases as well as specific contexts. By way of illustration, this type of rule may include the rule for identification of passage of a secured communication interface in unidirectional mode. This type of rule makes it possible to initialize the report with the changes in context. Although the corresponding lines in the report may not be directly linked to anomalies, they nonetheless are present (and retained) in order to facilitate the interpretation of the residue of unprocessed information items;

action-type rules: here they are classified according to the following three types, type 1: rules relating to several detected events that may be grouped in a single line in the report. By way of illustration, when several detected events are linked to the deinstallation of an application, a single line may be generated in the report, grouping all the useful information items, for example the following line, date/time/flight No./flight phase: deinstallation of application X (criticality 40)

type 2: rules relating to a single event but the significance of which necessitates being emphasized by the use of a line in the report. By way of illustration, the blocking of an address may be indicated in the following manner, date/time/flight No./flight phase: flow originating from the address 123.056.189.012 blocked by rule 65000 (criticality 60)

type 3: rules relating to an event linked to a performance threshold. By way of illustration, if an event is detected because the activity rate of a partition exceeds 95%, the following line may be generated in the report, date/time/flight No./flight phase: partition/var over X reaches 96% of activity (criticality 55)

occurrence-type rules: they relate to the same event detected on several occasions over a limited time period. The event concerned also may correspond to the results obtained by the application of action-type rules (in particular when several groups of detected events are represented in the form of several lines in the report). It should be noted here that several occurrence-type rules may relate to the same event, according to different levels of criticality, depending on the number of occurrences. By way of illustration, if a rule has as an object to control the number of session-opening requests formulated per minute, an occurrence rule may generate the following line in the report, date/time/flight No./flight phase: session-opening request from address X formulated 35,000 times during the last 2 hours (criticality 70)

contextual-type rules: they relate to one or more events corresponding to actions that can take place only in a certain context. By way of illustration, the contextual rule according to which verification by an intrusion-detection system is not to be carried out prior to flight phase No. 6 may generate the following line in the report, date/time/flight No./flight phase: verification by intrusion-detection system performed out of context, flight phase No. 5 (criticality 60)

elimination-type rules: they have as an object to eliminate detected events corresponding to known messages, without consequence. By way of illustration, a detected event linked to adjustment of the time such as "Time jump detected~=−5.438359141 seconds" is not taken into account. This type of rule, however, generates a line in the report so as to indicate the number of events eliminated. Such a line generated in the report is, for example, the following, For information, 250 lines of information, with no impact, eliminated rules concerning the rules: they are intended to specify the order of execution of certain types of rules. By way of illustration, a harmless operation such as session opening may be problematic if it is executed an abnormal number of times. Thus, occurrence rules are to be executed prior to elimination rules. Likewise, the transcription of an action rule may be an element activating a contextual rule. By way of illustration, an action-type rule may replace several detected elements with a single indication of loading of a software application, which may activate a contextual-type rule. Consequently, contextual-type rules are to be executed after action-type rules.

In this way, the generation of the report and the residue of unprocessed information items is performed in the correlation engine 125 by application of the rules of database 130.

Figure 3:
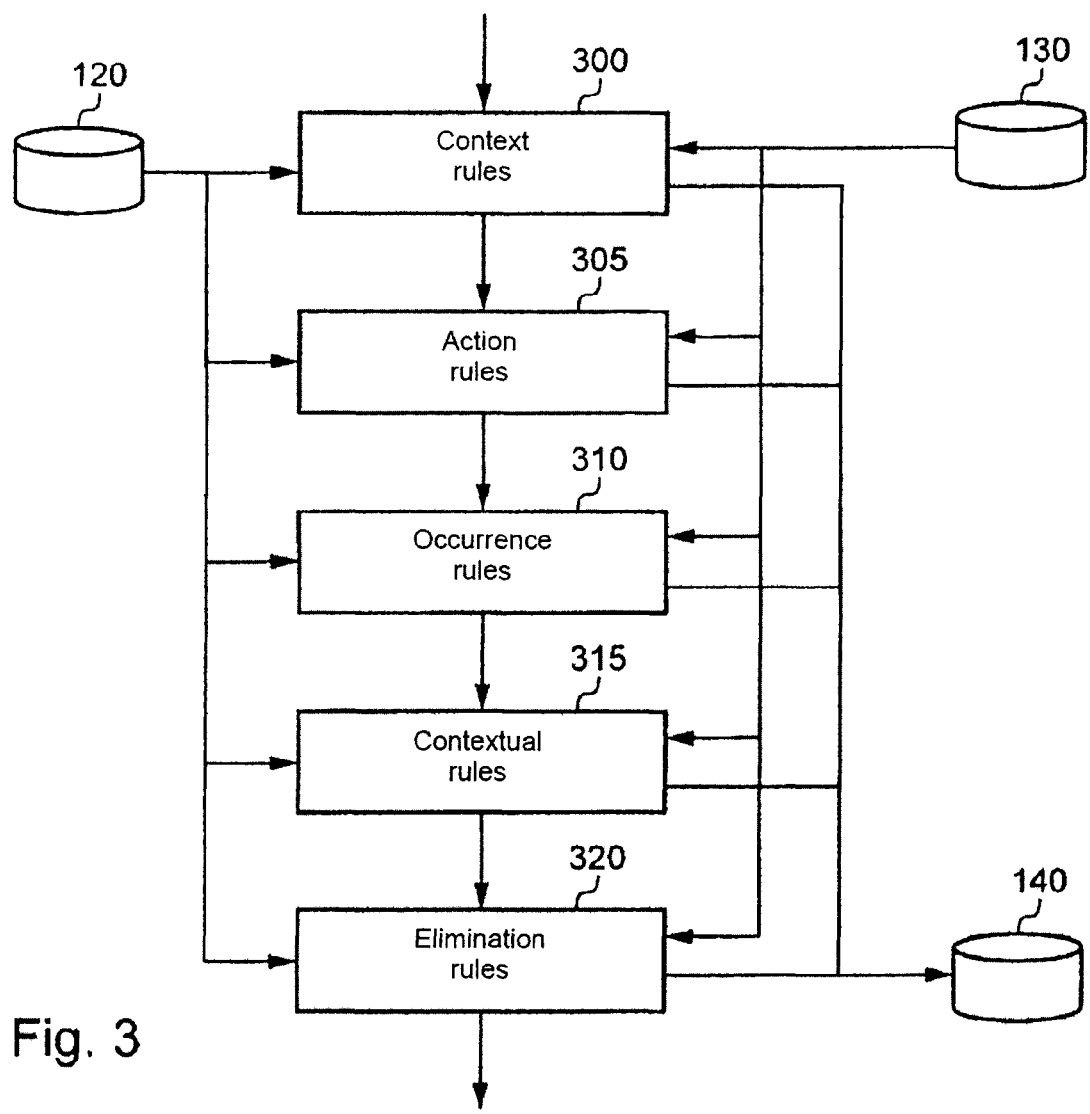

FIG. 3 schematically shows an exemplary algorithm implemented in the correlation engine in order to apply the rules of database 130 to the detected events here stored in database 120 so as to obtain a report stored here in database 140.

First, the rules for definition of context are implemented (step 300). For each rule for definition of context identified, the dates and times of beginning and end of context are recorded to be used by the contextual rules. The report preferably includes the following information items, a header with the name of the airline company operating the aircraft, the flight number, the date and time of the beginning of the first flight phase;

for each flight phase, the identification of the flight phase as well as the time of beginning and end of the flight phase;

for each change of context, the identification of the modifications in context as well as the corresponding times; and, an end-of-flight marker with the name of the airline company, the flight number, the date and time of end of the last flight phase.

The action-type rules then are taken into account (step 305). For each action rule identified, the overall action corresponding to a set of detected events is inserted, with the date and time, in the corresponding flight phase, in the report. It should be noted here that the detected events in the database of detected events, corresponding to the action-type rules identified, are not eliminated immediately in order to allow the correct execution of the occurrence-type and contextual-type rules.

Then the occurrence-type rules are applied (step 310). For each occurrence-type rule identified, the associated event is added in the report with the date and time, in the corresponding flight phase.

The contextual-type rules then are taken into account (step 315). For each contextual-type rule identified, the associated event is added in the report, with the date and time, in the corresponding flight phase.

Finally the elimination-type rules are applied (step 320). A line is added at the end of the report to specify the number of detected events, with no impact, that have not been mentioned in the report.

Figure 4:
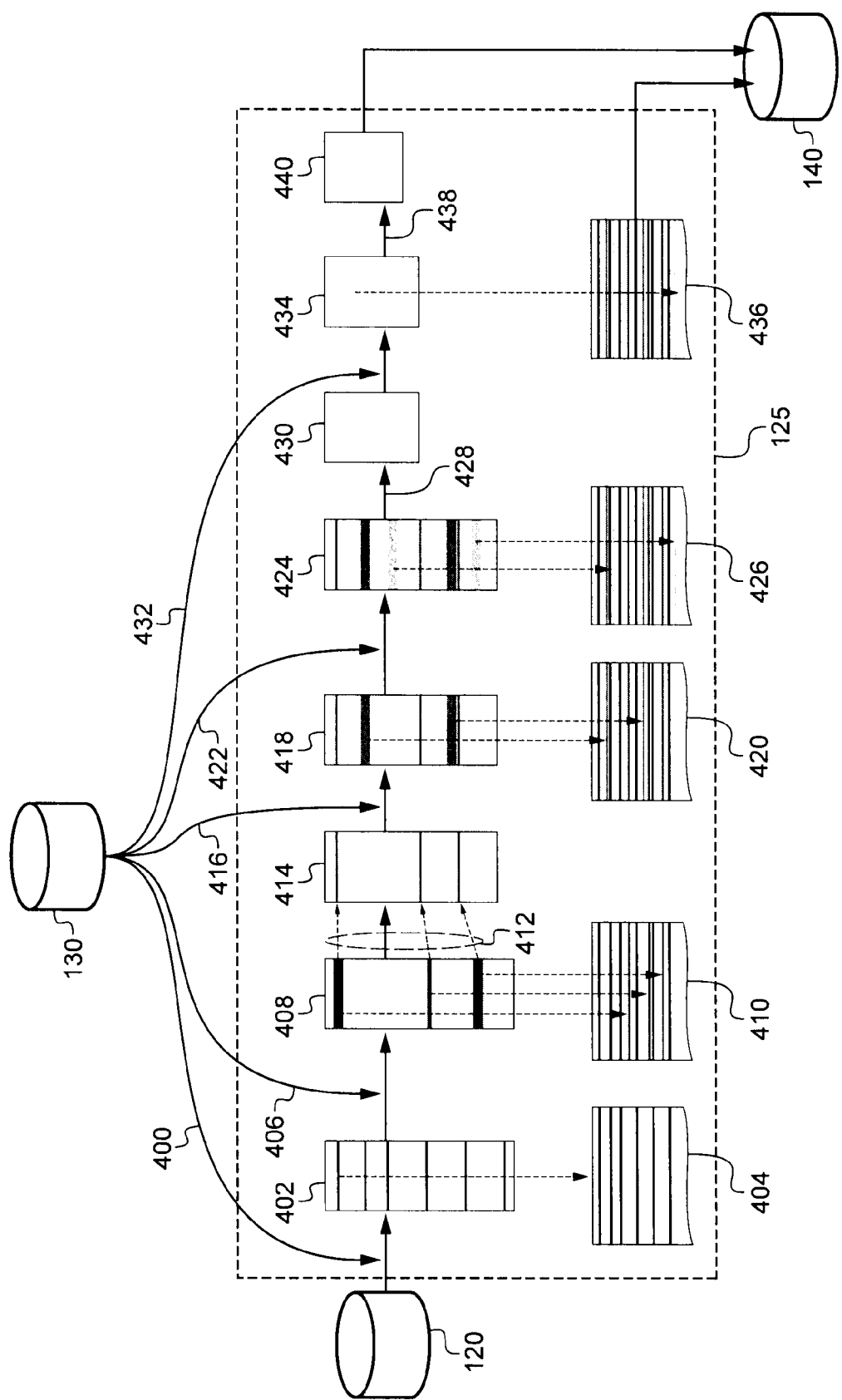
FIG. 4 illustrates an exemplary processing of detected events for the purpose of obtaining a report and a residue of unprocessed information items to be analyzed and validated.

FIG. 4 illustrates an exemplary processing of detected events for purposes of obtaining a report and a residue of unprocessed information items to be analyzed and validated. The detected events here are stored in database 120 in the form of a file. The latter is processed from rules stored in database 130 and context information items (not shown).

A first step has as an object the application (400) of rules for definition of context to the file representing the detected events. This step makes it possible to insert the notations described above in the file containing the detected events in order to obtain file 402, called residue file. This step also makes it possible to initialize the report, shown here in the form of file 404.

The action-type rules then are applied (406) to the file resulting from the preceding step. The detected events in the residue file, corresponding to an overall action, are marked in the residue file to be eliminated later. This file then acquires the reference 408. The overall actions identified are added simultaneously to the report the corresponding file of which acquires the reference 410.

The events marked in the residue file advantageously are replaced by references to the corresponding overall actions (412). The residue file then acquires the reference 414.

The occurrence-type rules then are applied (416). The detected events in file 414, satisfying the occurrence-type rules, are marked and a corresponding indication is generated in the file representing the report. The residue file then acquires the reference 418 while the file representing the report acquires the reference 420.

Similarly, the contextual-type rules are applied (422). The detected events in file 418, satisfying the contextual-type rules, are marked and a corresponding indication is generated in the file representing the report. The residue file then acquires the reference 424, while the file representing the report acquires the reference 426.

The detected events marked as satisfying the action-, occurrence- and contextual-type rules then are eliminated from the residue file (428) which acquires the reference 430.

The elimination-type rules then are applied (432). The detected events, with no impact on the security of the computer systems of the aircraft, then are identified and marked in residue file 430 which acquires the reference 434. A corresponding indication is added in the file representing the report. The latter acquires the reference 436. These events then are eliminated from the residue file which acquires the reference 440.

Files 440 and 436 are stored in database 140. File 440 corresponds to the residue of unprocessed information items, while file 436 corresponds to the report.

The implementation of the mechanisms according to the invention, such as illustrated on FIGS. 1 and 2, may be carried out partially in an aircraft and partially on the ground.

According to a first embodiment, modules 110, 125 and 215 as well as the set of databases 115, 120, 130, 135, 140, 205 and 210 are implemented in the computer systems of the aircraft, while modules 220, 225, 230 and 235 are implemented in computer systems of the ground. The data deriving from module 215 are stored temporarily in a database of the aircraft and transferred to the ground.

According to such an implementation, however, a systematic analysis on the ground is necessary after each flight. This may not be completely deferred. Furthermore, the implementation of new versions of the correlation engine and of new correlation rules must follow the process of configuration updating of the aircraft. Nonetheless, the secured transfer of data between the aircraft and the ground is easy to implement as soon as the aircraft is on the ground.

Alternatively, according to a second embodiment, only module 110 as well as the set of databases 115 and 120 is implemented in computer systems of the aircraft, modules 125, 215, 220, 225, 230 and 235 as well as databases 130, 135, 140, 205 and 210 being implemented in computer systems on the ground. Database 120 is transferred from the aircraft to the ground.

According to this embodiment, it is not necessary to analyze the data systematically on the ground after each flight. Further analysis on the ground may be deferred. Likewise, the implementation of new versions of the correlation engine and of new correlation rules does not need to follow the process of configuration updating of the aircraft. Such an implementation, however, necessitates means for secured transmission of detected events in the aircraft to the ground, during the flight phases of the aircraft.

It is seen here that, irrespective of the embodiment, the mechanisms for detection and for correlation of detected events as well as for maintenance of the computer systems of an aircraft in operational condition following the detection of events deriving from these computer systems and for improvement of the design of aircraft make it possible to withstand the evolutions of attacks affecting the security of the computer systems of the aircraft through updating of the systems for detection and analysis of events. Likewise, these mechanisms make it possible to define a coherent process for processing the results deriving from application of the correlation rules so as to maintain an aircraft in an operational state, because they are integrated into standard processes for maintenance of the aircraft.

Figure 5:
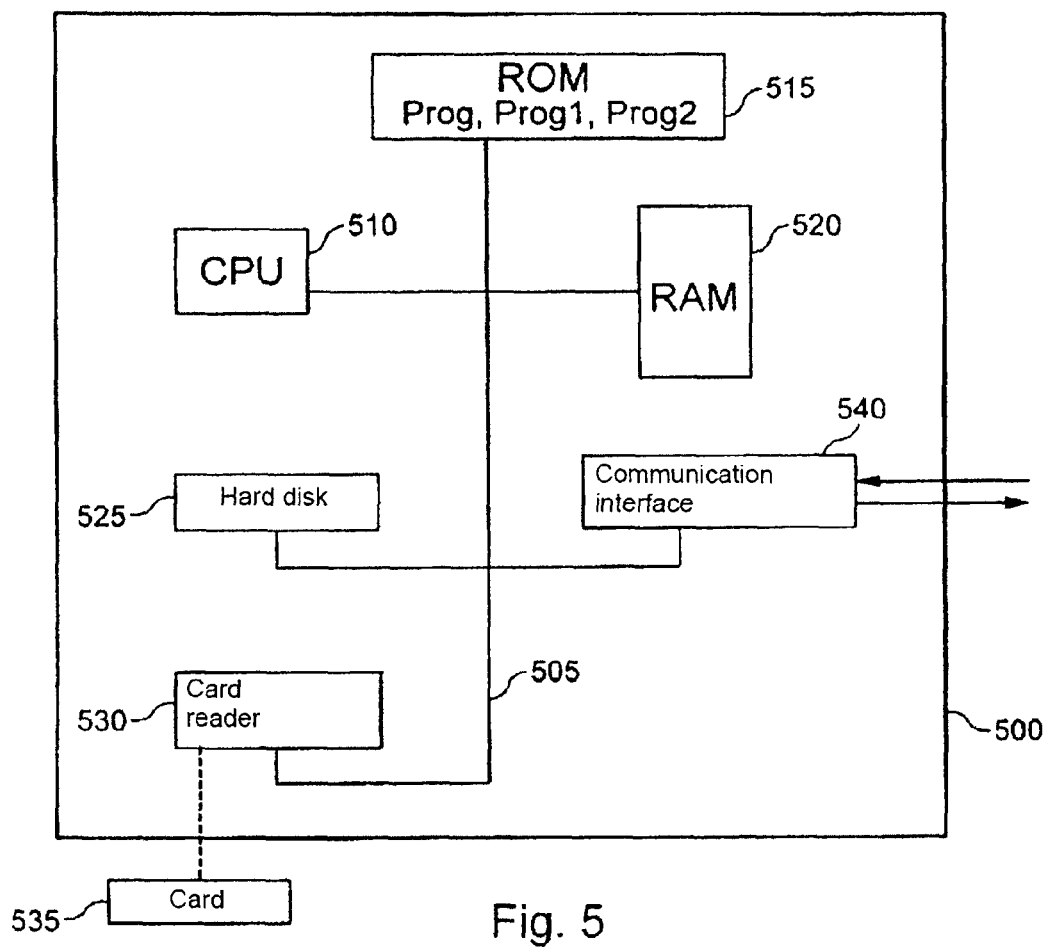
FIG. 5 illustrates an exemplary device adapted for implementing the invention or a part of the invention.

A device adapted for implementing the invention or a part of the invention is illustrated on FIG. 5. The device shown preferably is a standard device, for example a computer.

Device 500 here comprises an internal communication bus 505 to which there are connected:
- a central processing unit or microprocessor 510 (CPU, abbreviation for Central Processing Unit in English terminology);
- a read-only memory 515 (ROM, acronym for Read Only Memory in English terminology) able to comprise the programs necessary for implementation of the invention;
- a random-access memory or cache memory 520 (RAM, acronym for Random Access Memory in English terminology) comprising registers adapted for recording variables and parameters created and modified during running of the aforementioned programs;
- a communication interface 540 adapted for transmitting and receiving data to and from a communication network, for example a switched Ethernet network of AFDX (abbreviation for Avionics Full DupleX in English terminology) type.

Device 500 also preferably has the following components:
- a hard disk 525 able to comprise the aforementioned programs and data processed or to be processed according to the invention; and
- a memory card reader 530 adapted for receiving a memory card 535 and for reading or writing therein data processed or to be processed according to the invention.

The internal communication bus allows communication and interoperability between the various components included in device 500 or connected thereto.

The representation of the internal bus is not limitative and, in particular, the microprocessor is capable of communicating instructions to any component of device 500 directly or through another component of device 500.

The executable code of each program allowing the programmable device to implement the processes according to the invention may be stored, for example, on hard disk 525 or in read-only memory 515.

According to a variant, memory card 535 may contain data as well as the executable code of the aforementioned programs which, once read by device 500, is stored on hard disk 525.

According to another variant, the executable code of the programs will be able to be received, at least in part, through first communication interface 540, to be stored in a manner identical to that described above.

More generally, the program or programs could be loaded into one of the storage means of device 500 before being executed.

Microprocessor 510 is going to control and direct the execution of the instructions or portions of software code of the program or programs according to the invention, which instructions are stored on hard disk 525 or in read-only memory 515 or else in the other aforementioned storage components. During boot-up, the program or programs that are stored in a non-volatile memory, for example hard disk 525 or read-only memory 515, are transferred into random-access memory 520 which then contains the executable code of the program or programs according to the invention, as well as the registers for storing the variables and parameters necessary for implementation of the invention.

The communication apparatus comprising the device according to the invention also may be a programmed apparatus. This apparatus then contains the code of the computer program or programs for example set in an application-specific integrated circuit, also called ASIC (acronym for Application-Specific Integrated Circuit in English terminology).

Naturally, in order to meet specific needs, an individual competent in the area of the invention will be able to apply modifications in the foregoing description.

The invention claimed is:

1. A computer implemented method for management of events linked to security of at least one computer system of an aircraft, comprising:
   receiving information items relating to detection of a plurality of events;
   characterizing the plurality of detected events according to a set of rules of a plurality of predetermined rules, the set comprising several rules of different nature, making it possible to identify events requiring a further analysis, the detected events characterized based on a flight phase during which each event was detected; and, drawing up a security report according to the characterization of the plurality of detected events, the security report comprising at least two parts, one of the at least two parts being specific to the information items linked to the events requiring a special analysis, the security report grouping events based on the flight phase during which each event was detected.

2. The method according to claim 1, further comprising:

updating the plurality of rules according to a previously detected event.

3. The method according to claim 1 or claim 2, further comprising:

detecting the plurality of events, the plurality of events being detected according to a set of predetermined events, the set of predetermined events being updated according to a previously detected event.

4. The method according to claim 1, further comprising:

analyzing the security report.

5. The method according to claim 4, further comprising:

determining at least one new rule in response to the analysis of the security report, the plurality of predetermined rules being updated according to the at least one new rule determined.

6. The method according to claim 4, further comprising:

verifying and validating at least one information item of the security report.

7. The method according to claim 1, further comprising:

inserting in the security report at least one indication relating to a context associated with at least one detected event.

8. The method according to claim 1, further comprising:

updating the definition of the aircraft.

9. A device comprising:

means for the implementation of each of the steps of the method according to claim 1.

10. A non-transitory computer readable medium encoded with a program comprising instructions adapted for the implementation of the method according to claim 1 when the program is run on a computer.

* * * * *